(No Model.)
M. GARLAND.
WATER CLOSET BOWL.
No. 544,251.　　　　　　　　　　Patented Aug. 6, 1895.
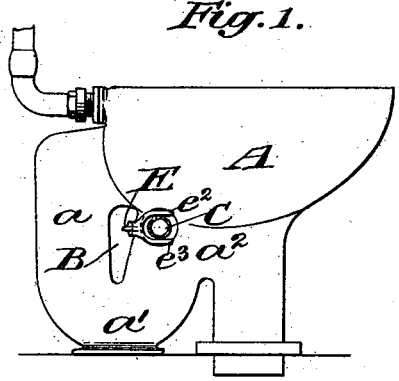
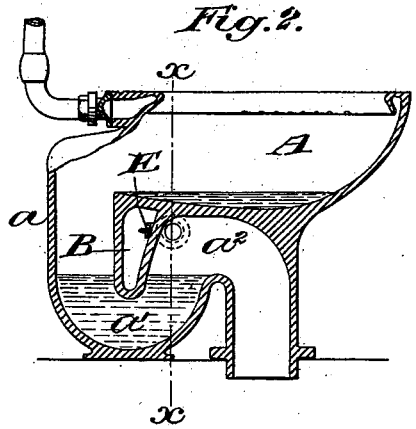
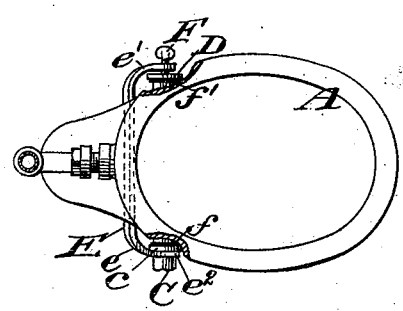
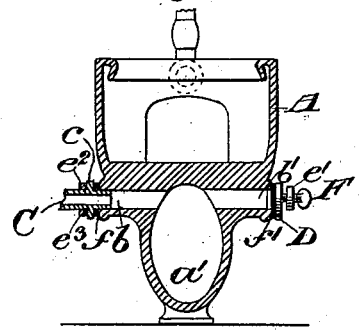
Witnesses:—
George Barry,
C. E. Sundgren.
Inventor:
Michael Garland
by attorneys
Brown & Seward

UNITED STATES PATENT OFFICE.

MICHAEL GARLAND, OF SEABRIGHT, NEW JERSEY, ASSIGNOR TO JULIA A. GARLAND, OF SAME PLACE.

WATER-CLOSET BOWL.

SPECIFICATION forming part of Letters Patent No. 544,251, dated August 6, 1895.

Application filed August 1, 1894. Serial No. 519,140. (No model.)

*To all whom it may concern:*

Be it known that I, MICHAEL GARLAND, of Seabright, in the county of Monmouth and State of New Jersey, have invented a new and useful Improvement in Water-Closet Bowls, of which the following is a specification.

My invention relates to an improvement in water-closet bowls, and more particularly to the means for coupling thereto the air outleting or relief pipe, or other outleting pipe or pipes, where the bowl is made of porcelain or other frangible material.

It has hitherto been common to seal the coupling-piece in the form of a tube or collar into an opening in the bowl and to then connect with this coupling-piece, commonly made of metal, the outleting-pipe. This has proved unsatisfactory in certain particulars, notably in the expansion and contraction of the pipe under the varying conditions of temperature tending to crack the porcelain, and the rigidity of the joint has rendered it liable in fitting the pipe to loosen the sealed coupling and cause leakage. It has furthermore been common, where the connection was to be made on the opposite side of the bowl from that usually intended, to order a special structure of bowl with the opening on the reverse side to accommodate that particular place.

My present invention contemplates the coupling of the outleting-pipe directly to the bowl in an effective manner and at the same time in such a yielding manner as to render breakage unlikely and fit the bowl for the attachment of the outleting-pipe on either side, as may be found most convenient.

A practical embodiment of my invention is represented in the accompanying drawings, in which—

Figure 1 represents a bowl in side elevation, showing the outleting-pipe in section and secured to the side of the neck of the bowl. Fig. 2 is a view of the same in vertical section from front to rear. Fig. 3 is a top plan view; and Fig. 4 is a view in transverse vertical section on line $x$ $x$ of Fig. 2 through the openings for connecting the pipe.

A represents the bowl; $a$, its neck leading to the trap $a'$, and $a^2$ is the turn in the neck adjacent to the trap. As is common, the neck of the bowl in forming the trap $a'$ leaves an opening B through from side to side between the downwardly and upwardly extending branches of the trap. On opposite sides of the upwardly-extending branch of the trap $A'$, I provide openings $b$ $b'$, which openings are surrounded by bosses or rims projecting outwardly a short distance from the side of the neck, the rims and the openings being cast or molded integral with the porcelain or other material of which the bowl is formed. The outleting or relief pipe C is provided near its end with a collar $c$, and from the collar to its extreme end it is made of such size as to fit loosely within the openings $b$ or $b'$, cast or molded in the side of the neck of the bowl. I also provide a stopper D, adapted to fit either the opening $b$ or $b'$ and simultaneously secure the stopper D and the pipe C, the one in one of the openings $b$ and the other in the other of the openings $b'$ by means of a clamp. The clamp which I find it convenient to utilize consists of a shank E, which may be extended through the opening B between the branches of the trap and ends $e$ $e'$ turned laterally with respect to the shank E into position to overlap the pipe C and the stopper D. The end $e$ for engaging the pipe C is forked to embrace the opposite sides of the pipe C outside of the collar $c$, as clearly indicated in Fig. 4, where the branches of the forked end are denoted by $e^2$ and $e^3$, and the opposite end $e'$, which overlaps the stopper D, is provided with a thumb-screw F, having a screw-threaded engagement with the end $e'$, so that when the pipe C, stopper D, and clamp are in assembled adjustment, as shown in Fig. 3, the turning of the screw F inwardly will force the stopper D snugly against the rim of the opening $b'$ and at the same time will draw the pipe C snugly against the rim of the opening $b$.

Intermediate of the rims of the openings $b$ $b'$ and the pipe or stopper, which is pressed against them, I locate washers $f$ $f'$, of some suitable yielding material, to effect an air and water tight joint and to cushion the pipe or stopper on the porcelain.

It is obvious that slight changes might be resorted to in the form and arrangement of the parts herein described without departing from the spirit and scope of my invention.

Hence I do not wish to limit myself strictly to the structure herein described; but

What I claim is—

The combination with a water closet bowl provided with openings on the opposite sides of its neck and a pipe and a stopper interchangeably fitted to loosely enter the said openings, of a clamp having its shank arranged to pass through the space formed by the branches of the trap and having its ends turned to overlap a portion of the pipe and a portion of the stopper, and a clamping screw engaged with one end of the clamp for the purpose of simultaneously forcing the stopper and the pipe toward the bowl, substantially as set forth.

MICHAEL GARLAND.

Witnesses:
FREDK. HAYNES,
GEORGE BARRY.